United States Patent [19]
Maloney et al.

[11] Patent Number: 5,959,580
[45] Date of Patent: Sep. 28, 1999

[54] COMMUNICATIONS LOCALIZATION SYSTEM

[75] Inventors: John E. Maloney, Springfield; Charles J. Hinkle, Jr., Vienna; James O. Stevenson, Fairfax, all of Va.

[73] Assignee: KSI Inc., Annandale, Va.

[21] Appl. No.: 08/335,331

[22] Filed: Nov. 3, 1994

[51] Int. Cl.[6] .................................................. G01S 3/02
[52] U.S. Cl. ................................ 342/457; 701/207
[58] Field of Search ........................... 342/457; 364/449, 364/438, 436, 458, 460; 701/207

[56] References Cited

U.S. PATENT DOCUMENTS

| | | |
|---|---|---|
| 4,728,959 | 3/1988 | Maloney et al. . |
| 4,742,357 | 5/1988 | Rackley .................................. 342/457 |
| 5,003,317 | 3/1991 | Gray et al. . |
| 5,045,860 | 9/1991 | Hodson .................................. 342/451 |
| 5,056,106 | 10/1991 | Wang et al. . |
| 5,119,104 | 6/1992 | Heller . |
| 5,163,004 | 11/1992 | Rentz . |
| 5,166,694 | 11/1992 | Russell et al. . |
| 5,218,367 | 6/1993 | Sheffer et al. . |
| 5,225,809 | 7/1993 | Bunn . |
| 5,264,857 | 11/1993 | Baghdady . |
| 5,293,642 | 3/1994 | Lo . |
| 5,299,132 | 3/1994 | Wortham . |
| 5,311,195 | 5/1994 | Mathis et al. . |
| 5,317,323 | 5/1994 | Kennedy et al. . |
| 5,319,374 | 6/1994 | Desai et al. . |
| 5,428,546 | 6/1995 | Shah et al. ............................. 342/457 |
| 5,465,289 | 11/1995 | Kennedy, Jr. ............................ 379/59 |

OTHER PUBLICATIONS

Roy E. Bethel et al., "A PDF Tracker", IEEE Transactions on Aerospace and Eledtronic Systems, vol. 30, Apr. 1994, pp. 386–403.

*Primary Examiner*—Theodore M. Blum
*Attorney, Agent, or Firm*—Sterne, Kessler, Goldstein & Fox P.L.L.C.

[57] ABSTRACT

A method and apparatus for locating a mobile radio communications transceiver in a cellular-telephone or cell-like communications system uses a simplified system for passive monitoring of the signals emitted by the transceiver. A single base station can determine a line of bearing to the remote transceiver. This line of bearing is then combined with collateral, position-sensitive information to determine the likely location of the transceiver. The present invention has particular applicability to roadway transportation in that it facilitates enhanced emergency (9-1-1) services and roadside assistance in response to calls for assistance, and it permits the passive monitoring of traffic flow.

92 Claims, 3 Drawing Sheets

COMMUNICATIONS LOCALIZATION SYSTEM

BACKGROUND AND SUMMARY OF THE INVENTION

The present invention is directed to determining the geographic location of a mobile radio communications transmitter that is part of a cellular or cellular-like communications system (such as classified in U.S. class 342, subclass 457) so as to facilitate emergency service responses, roadside assistance, traffic monitoring, or other services that can apply or be supported by the location information.

Cellular telephone systems now provide ready access to wireless telephone communications. Present cellular telephones operate in an analog system of frequency division multiple access (FDMA). Digital technologies, including time division multiple access (TDMA) or code division multiple access (CDMA), offer greater capacity and should give more individuals simultaneous access to cellular telephone services. In addition, cellular-like communications systems, such as personal communication systems (PCSs), will further increase the number of individuals with access to a wireless communication network.

A cellular-telephone or cell-like communication system involves a network of fixed base stations that provide an integrated communication service to a plurality of mobile transmitter/receiver ("transceiver") units, e.g., cellular telephones. The communications network attempts to communicate with each transceiver from the base station which provides the optimal communication. The optimal base station is usually, but not necessarily, the one nearest the mobile transceiver. To provide the optimal communications support, the network need not locate the geographic position of the mobile transceiver more accurately than needed to determine which base station to use.

The inability of existing communication networks for cellular-telephone or cell-like communication systems to accurately determine the location of a mobile transmitter is a major disadvantage in an emergency. For example, public safety officials in Los Angeles estimate that, today, a quarter of all who call the emergency number ("9-1-1") from a cellular telephone do not know where they are when they call. The time spent in finding their location delays emergency assistance units, for example, police or ambulance services, in providing assistance. Other studies indicate that in excess of sixty percent of traffic fatalities in the United States occur on rural roadways. Delays caused by uncertainty in location also exacerbate the inherently longer response times for providing emergency services in rural areas.

The problem of locating the position of a mobile radio transceiver has been solved in many ways for many years but in systems other than that of a cellular-telephone or cell-like communication system. No simple, low-cost solution has been found that is practical when applied to the wide-scale monitoring of mobile telephones. One practical difficulty in implementing any type of localization for mobile radio transceivers is the cost of the modifications either to the transceiver or to the communications network (infrastructure) that are needed to determine the location of the mobile transceiver. Any given transceiver would rarely, if ever, be used in placing a request for emergency or roadside assistance. Thus, the suppliers of transceivers and the operators of communications networks have little economic incentive to increase the complexity (and cost) of the transceivers or to install an extensive and expensive infrastructure to support such rarely used services absent government mandate. However unprofitable in the short term, the value of emergency assistance and roadside assistance services have unquestionable value for providing and enhancing personal and public safety. Ameliorating the increasing incidence of violence and the related, growing concern for personal security with a mobile communications system is a worthy policy goal with the potential for realizing enormous benefit to subscribers, network operators, and the general public alike. However, realizing the objective, even one so important and valuable, requires a practical, inexpensive infrastructure for uniquely identifying people requesting or reporting the need for assistance, communicating with them, and providing their locations to a responding assistant.

Techniques exist for accurately determining one's position in applications other than that of providing emergency or roadside assistance. For example, the satellite-based Global Positioning System (GPS) allows determination of the location of the point of GPS signal reception with a special-purpose receiver for the wireless GPS signals that are broadcast from the satellites. However, obtaining the position of a communications transceiver by using GPS requires the mobile transceiver to include a GPS receiver. GPS receivers are expensive. Even if their cost were to be reduced through mass production, GPS receivers would still have to be integrated with all existing and future mobile transceivers. The cost associated with this solution seems to be prohibitive in view of the infrequency of use of the service and especially in terms of the large number of mobile transceivers for which the localization capability is desired.

Techniques also exist for locating the position of mobile communications transceivers by passively monitoring their radio emissions. However, with the simplest of approaches, radio localization does not take into consideration the distortions in apparent location caused by multipath interference (multipathing). Multipathing involves radio signals bouncing off of objects such as vehicles, buildings, hillsides, etc. Without consideration of these effects, the apparent position of the transceiver will be distorted. Multipath propagation is common for short-wavelength, radio communications since relatively smaller objects can reflect substantial amounts of the transmitted signals, and it is especially common in cities with buildings reflecting the signals. The potential, multipath-induced distortions in the apparent position of the mobile transceiver is therefore a problem that must be addressed in passively localizing radio emitters to support applications such as the provision of emergency or roadside assistance.

Multipath propagation conditions need not impede locating a transceiver when signal analysis and source localization procedures are used to ameliorate potential distortions in apparent position. For example, U.S. Pat. No. 4,728,959 to Maloney et al. demonstrates how direction finding procedures, by which the direction of the arrival of a signal can be estimated, can be applied with two or more receiving base stations. Using the passive monitoring of communication signals that is described in this patent to determine location is an excellent application in that it allows for locating a mobile transceiver anywhere in a service area of a network having at least two receiving stations of known location. The direction finding approach is simpler, more accurate, and less costly than other approaches. However, the necessity of requiring joint reception of a common signal at multiple sites can increase the complexity and cost of this approach beyond what some cellular telephone or PCS companies are currently or may be willing to accept.

Often, in addition to directional data that can be derived from received signal characteristics, other information is available or can be obtained that relates to the position of a mobile radio transceiver. For example, in a system designed to provide emergency roadside assistance, we may presume that the person requesting assistance is in a vehicle that is on or near a road. Such a presumption may be verified, for example, by asking the person placing the call if he or she is on a road. This type of additional geographic or topological information, called here "collateral information", is of a type that is normally available to a dispatcher. Combining collateral information with the directional information from even a single base station can define the location of a mobile radio transceiver well enough to make it possible to dispatch emergency and roadside assistance services. The derivation of the position of the transceiver solely from observed characteristics of its radio emissions received at multiple sites is not necessary, and the need for additional base stations thus becomes redundant. However, no proposal to date has sought to use such collateral information to make redundant the need for additional base stations.

Monitoring mobile transceivers that are located on vehicles has advantages other than providing support for responses to requests for assistance. One such advantage is enabling the cost effective monitoring of traffic flow. Unplanned traffic incidents ("traffic jams") clog the highways with a resulting deleterious effects on safety, environment, and economy. The volume of message traffic in a major metropolitan area is a type of collateral information, and it can be combined with observed location- and speed-related information and topographic information (e.g., road maps), to indicate which roads are passable and which are congested. However, traffic flow information, like emergency services and roadside assistance, are not the primary reason for establishing a communication system and thus are not provided currently. The cost of adding equipment to the communications infrastructure to provide traffic flow information seems possible to justify to communications companies only if it can be done using the most modest of infrastructure enhancements.

Today, techniques exist that provide partial and complex solutions to the problem of providing geographical locations with sufficient accuracy to aid emergency and roadside assistance personnel. However, such systems rely on observed information derived from multiple, joint receptions of radio emissions, or on navigation information from devices extraneous to the communications transceiver. No system seeks to obtain location information from the combination of observed directional information, derived from communications radio receptions, with collateral information obtained, for example, from street maps. Therefore, it is an object of the present invention to provide a simple and effective way to identify and locate a mobile radio transceiver in any wireless communication system, including those already existing or that are contemplated, such as those for personal communication systems (PCSs), cellular telephones, specialized mobile radios (SMRs), and personal digital assistants (PDAs). It is an object of the present invention to provide an automatic location identification (ALI) and an automatic "number" identification (ANI) that facilitates national and international rural and urban emergency notification and personal security, and roadway monitoring by combining observed information derived from received radio emissions with collateral information derived from street maps, user descriptions, and other information sources.

It is also an objective of the present invention include: providing a system in which location and identification are provided cheaply as adjuncts to communications for national and international wireless enhanced 9-1-1 (E9-1-1) emergency and routine roadside assistance notification; estimating roadway speed and providing general transportation information such as traffic congestion and flow characterization; providing such capability in a system which is both relatively easy to deploy and inexpensive to construct; providing a system which has a transportable configuration and, therefore, can be used to temporarily monitor localized regions such as road construction areas or the localities of special events such as sporting competitions, conventions, or concerts; providing a combination of processes and attributes to form an inexpensive yet robust system for localization and identification as an adjunct to a communications system.

The present invention provides an apparatus for locating a mobile radio communications transceiver in a wireless communications system that comprises a sensor station of substantially known location, the sensor station having a directionally sensitive receiving antenna to receive a radio signal from the mobile transceiver, a signal characterization processing unit for determining a directional line of bearing from the sensor station to the mobile radio transceiver from the radio signal, a source of collateral information about the mobile transceiver, a multidimensional parametric correlation processing unit for determining a probable position of the mobile transceiver from the line of bearing information and the collateral information, and an output indicative of the probable position of the mobile transceiver.

The present invention provides for locating a mobile radio transceiver in a cellular-telephone or cell-like communications system using a simplified system for passively monitoring signals emitted by the mobile transceiver. In this invention, the processing at a single receiving base station of known location determines a line of bearing (i.e., a direction angle from the receiving site) to the mobile transceiver location. This line of bearing is then combined with collateral information to determine the likely location of the transceiver. The present invention has particular applicability to roadway transportation in that it facilitates emergency (9-1-1) services and roadside assistance, and it permits the passive monitoring of traffic flow. The collateral information includes location information derived from other than radio location methods. Such information can include the topological information of a map of the roadways in the area of the base station, or other information such as derived speed, if any, of the transceiver, or information obtained from communications from the caller in person or from equipment at the caller's location.

The present invention does not require determining position by crossfixing a position using lines of bearing from two or more base stations; a single base station can be enough. This capability may have particular usefulness in a CDMA communications network in which increased capacity is obtained through dynamic power control so that only one base station is intended to receive a transceiver's emissions. Nevertheless, there is nothing in the present invention that precludes using more than one base station to further confirm the accuracy of a location or to permit locating mobile radio transceivers for which collateral information is not otherwise available. The ability to determine location from a single site has particular benefit for providing emergency assistance in that single site reception is applicable in more environments, requires less infrastructure, and offers greatly reduced cost. The present invention is particularly useful for monitoring traffic in rural areas that have fewer roads such that collateral information in the form of roadway topology better indicates the exact location of the mobile transceiver along the observed line of bearing. The present invention also provides a method and apparatus for locating a mobile radio transceiver in a wireless communications system, comprising a sensor station of substantially known location, a method and means for determining a line of bearing from the sensor station to the mobile radio communications transceiver, and a method and means for combining collateral information with the line of bearing to determine the location of the mobile radio transceiver.

The present invention has the advantage of being able to determine the location of a mobile radio transceiver without requiring embedding or integrating a special purpose device, such as a GPS receiver, with the mobile transceiver. Indeed, the present invention enables the localization of all existing cellular telephones. The cost of deploying a location system of the present invention is low. This low start up cost means that the system can be deployed faster so that consumers can realize the benefits sooner and at less expense.

DETAILED DESCRIPTION

Figure 1:
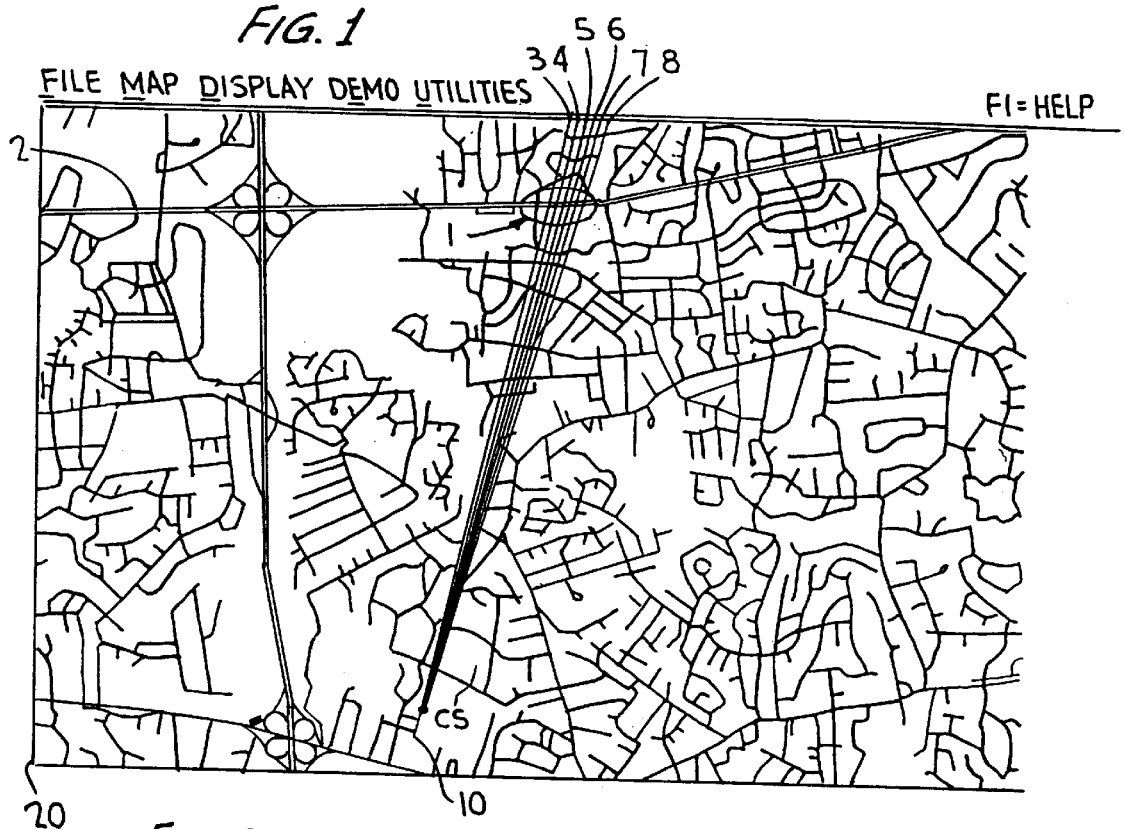
FIG. 1 illustrates the locations of a cellular telephone transceiver that can be obtained through the present invention by the correlation of directional information with the road location information inherent in a road network map.

FIG. 1 shows how the present invention can determine the location of a mobile transceiver. FIG. 1 shows collateral information in the form of a street map of a portion of Annandale, Va, in the United States, and a mobile radio transceiver in the form of a cellular telephone. A vehicle having the cellular telephone is in the localization area labeled 1 along a highway 2 (Virginia (Va) Route 50). A directional antenna located at the sensor station 10 determines a series of lines of bearing 3–8 at different times.

The lines of bearing 3–8 are overlaid on the topological data 20 that represents the street map of the area. The data for these digitalized maps of urban areas are readily available from, for example, ETAK Inc., in Menlo Park, Calif., Navigation Technologies, in Sunnyvale, Calif., Roadnet Technologies, Inc., in Timonium, Md., or the Bureau of the Census, U.S. Department of Commerce, in Washington, DC. These maps represent collateral information in the form of the topology of the area in which the mobile radio transceiver operates. The present invention seeks to use such collateral information to enable a control station (also at 10 in FIG. 1) to use directions observed from even a single sensor station together with the collateral information to determine the location of mobile radio transceivers operating in area 1.

Figure 2:
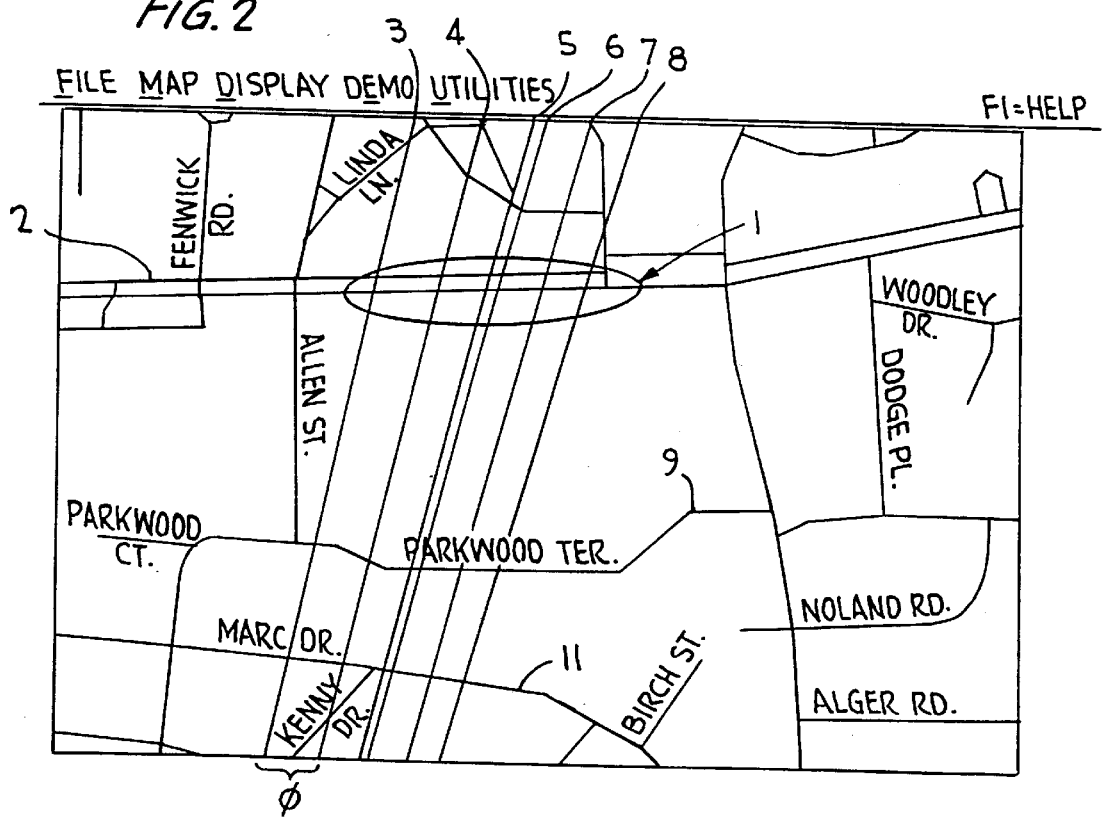
FIG. 2 shows an expanded view of the intersections of the directional lines of FIG. 1 with the road of interest.

FIG. 2 shows an expanded view of the localization area 1 shown in FIG. 1. The lines of bearing 3–8 are shown as crossing the streets labeled 9 (Parkwood Terrace) and 11 (Marc Drive). From any one of the lines of bearing 3–8, there is no way to determine on which of the streets 2, 9, or 11 the mobile transceiver is located. However, any two of the lines of bearing, for example 3 and 4, provides an arc length $\phi$ corresponding to some geographic distance covered by the mobile transceiver in area 1. Recording the time at which each of the lines of bearing are measured enables the control system 10 to determine an approximate speed of travel for the mobile transceiver in area 1. A high rate of travel, say 80 km/hr (50 mph), for a communicating cellular telephone implies that the mobile transceiver is on the main highway 2 (VA Route 50) rather than one of the residential streets 9 or 11 where the posted speed limit, 40 km/hr (25 mph), is half the observed rate. Thus, by applying collateral information in the form of the relative posted speed limits or the average speed distributions for the roads 2, 9, and 11 in FIG. 2, the control station 10 can infer on which street to place the probable localization area 1.

In the preceding example, it might appear that the control station 10 can not determine whether the mobile transceiver is on the main highway 2 or some other streets 9 or 11 solely from lines of bearing unless the transceiver is also moving at a high rate of speed. For the localization of a stationary transceiver, emergency (9-1-1) assistance would require some other form of collateral information. For example, the assisting dispatcher could obtain additional information by asking the parties requesting the assistance whether they are on a major road and, if not, seek some other form of descriptive information, such as street names or known landmarks, that would distinguish side streets 9 from 11. The geographic information inherent in such solicited data, when combined with the positional information in the line of bearing measurements, enables the estimation of the transceivers' locations.

Moreover, even the absence of motion has significance for other purposes such as monitoring traffic flow. Based on common traffic characteristics, the control station 10 could presume that most cellular telephone calls from the region of area 1 would originate from the main highway 2. The transceivers should predominantly exhibit a ground speed corresponding to the posted limits of the road. If the characteristic speeds of such transceivers are observed to be significantly below that of normal roadway conditions in or around area 1, such information would suggest that the main highway 2 is abnormally congested. Traffic alerts could be issued indicating the congestion, and emergency or other service vehicles could be dispatched to investigate the origin of the congestion if it suggests that an accident has occurred. None of these functions require additional information other than the timings of different lines of bearing and knowledge of normal road characteristics, but could always be augmented by such information if any is available.

Figure 3:
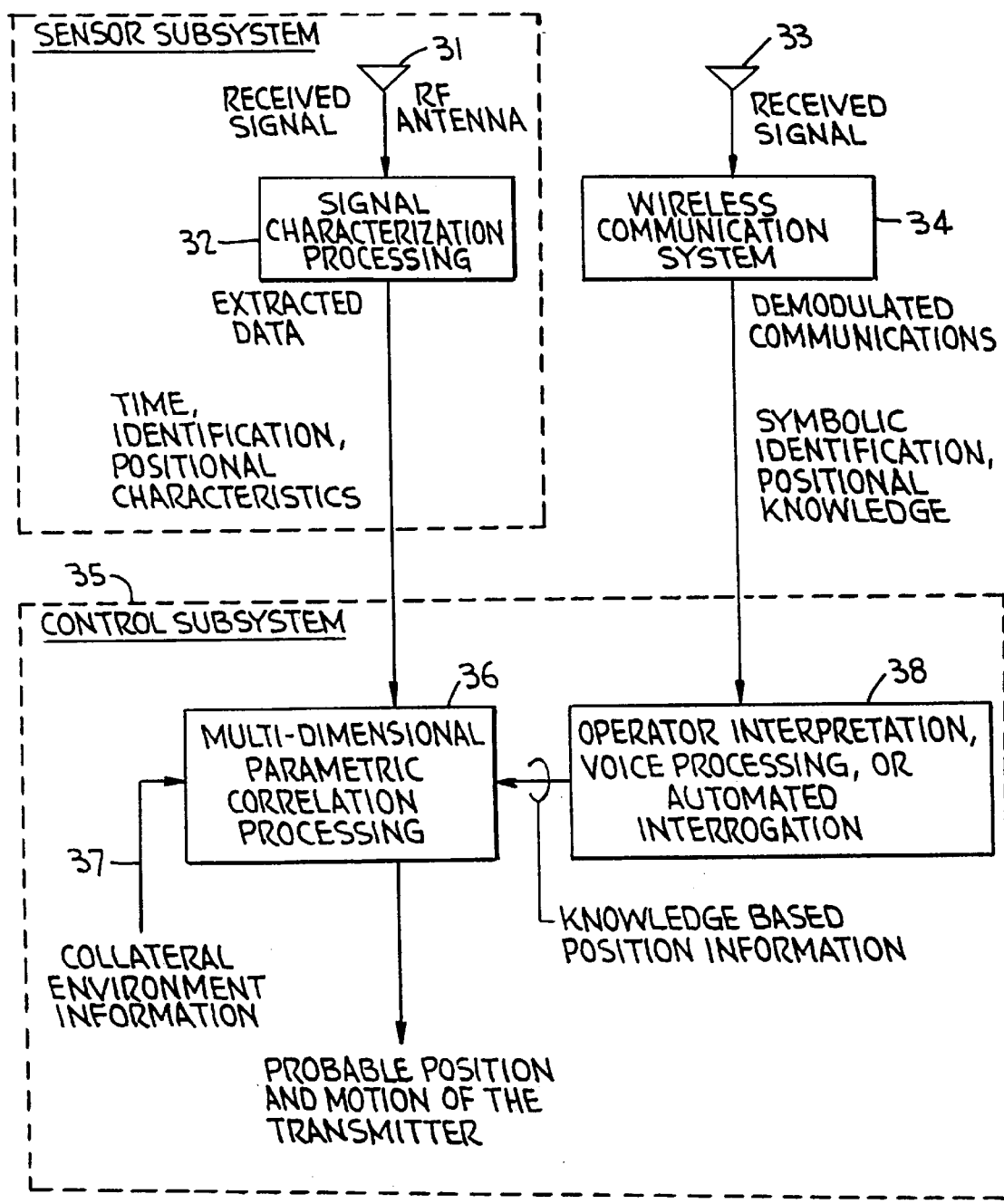
FIG. 3 shows the functional components of the system that enables the integration of directional and other characteristic signal information with the collateral geographic information derived from other sources to obtain the locations of wireless transceivers under normal communications operations.

FIG. 3 shows a block diagram of a system to carry out the present invention. A sensor subsystem 30 includes a RF antenna 31 that is connected to a signal characterization processing unit 32. The RF antenna 31 is a directional antenna that is designed to support the process of measuring the direction angle (i.e., line of bearing) of the arriving signal. A phased-array antenna station for obtaining such measurements is disclosed in U.S. Pat. No. 4,728,959 and incorporated herein by reference. The signal characterization processing unit 32 extracts the direction angle of arrival of the RF signal, and identifies the time at which such measurement is obtained. Such processing can be accomplished with statistical techniques as are also described in U.S. Pat. No. 4,728,959. With the phased-array antenna, the extraction of the bearing information from the characteristics of the received signal can be accomplished directly by statistically measuring the inter-signal phase differences of the signal forms received with the distinct antenna elements, since the signal passes the distinct elements at different relative positions and hence is sensed at different phases which depend upon the direction of arrival. Equivalently, the phased-array bearing determination can be obtained indirectly by exploiting these inter-element signal phase differences in comparative power analyses through "forming beams" or otherwise determining the direction from which the phase-differences are in alignment and thereby produce maximum received signal power when accumulated. As still another alternative, directional measurement can be obtained by mechanically turning the pointing direction of a parabolic reflecting or focusing antenna that structurally forms beams for the determination of maximal power reception.

The sensor system passively receives the radio frequency signals that occur in the normal use of the wireless communication system 32 and converts them into information for the control system 35 which is described below. In addition to the direction from which the signal has been received, this information includes the time at which a processed signal arrived and the identification of its transceiver, and can also include observations of collateral, position-related characteristics such as direction of motion or rate of change in direction of arrival, signal strength, and even two-way signal travel time in a communications system of very tightly controlled transceivers with transponding protocols and large signal bandwidth. By extending the time duration (i.e., the integration time or "dwell" time) over which the directional analyses of the captured signal are performed, the processing can produce the measure of the rate of change of bearing, as well as of the bearing itself. This rate of change can be detectable from the extended measurement process because the standard assumption of constant bearing during the measurement process will not be valid and will produce degraded measurements when the signal is received from a perceptibly moving radio transceiver. The rate of change of direction is related to the tangential velocity of motion of the communicating transceiver. As an added measure of the transceiver position, the characterization processing can determine the received signal power (i.e., the variance or mean square of the bias-free signal level). The signal power is indicative (through signal propagation evaluations discussed further below) of the range or distance from the receiving site to the mobile transceiver, and the rate of change of signal power or other power variation characteristics can be indicative not only of the radial speed of movement of the transceiver, but also of the physical obstructions or multipath interference causes that are known to accompany signal propagation from known geographic regions. Unobstructed two-way signal travel time is proportional to twice the range from receiving site to the location of the mobile transceiver. All of the measured physical characteristics of a received radio signal form the bases for localization processing in which the measurements are correlated with known relations to hypothesized transceiver position and motion.

The information regarding the lines of bearing and their measurement times and uncertainties is collected from one or more sensor stations and inserted into a multidimensional parametric correlation processing unit 36. The processing unit 36 combines the line of bearing information with other, collateral information from inputs 32, 37, or 38 to determine the location of the vehicle. The phrase "collateral information" applies to observed characteristics that augment the directional data and also includes information derived from sources other than the radio emissions of the mobile radio transceiver. Collateral information includes information on the environment in which the mobile transceiver is believed to be operating, e.g., the configuration of the roadway network, topographical features and boundaries, signal propagation characteristics, information on the weather and its effect on signal propagation and roadway traffic conditions, and also includes verbalized or other description of route number, road name, speed, nearby landmarks, or other position-sensitive information communicated from the mobile transceiver. The roadway and topographical representation data is available from distributors, such as those identified above for mapping data, of databases for geographic information systems. Additional data representing the posted speed limits of the road sections contained in the data bases are also generally available from the map data producers or alternatively from state government transportation departments. Additionally, the characteristic speed distributions of traffic on various road sections as a function of time of day, weather conditions, day of week, and season of year are often available from traffic flow studies that are routinely conducted by state departments of transportation. Alternatively, such data characterizing the positional dependencies of traffic flow can be accumulated from the flow statistics collected with the present invention in unambiguous events, and can then be recursively updated to obtain more rapid and robust determinations as the statistical precision of the databases is augmented.

The relationship between signal strength (i.e., power) and range is supporting information that can be available in a database as collateral data representing signal propagation characteristics. A standard relation between strength and range is that the received signal strength or power is inversely proportional to the square of range. However, in the multipath environment that normally characterizes short wavelength communications (such as that of cellular systems), the strength can be typically proportional to the inverse of the second to sixth power of the range and is highly dependent upon the direction of signal arrival and the weather conditions. Thus the utility of signal strength as an indicator of range depends on the accuracy to which the data base of collateral information represents the strength-to-range transformation, i.e., the signal propagation characteristics. For an approximate correlation of measures of signal power to the estimated range from receiver to mobile transceiver, signal propagation analyses can apply the static or dynamic projections of RF propagation predictions. Computer software facilities for such signal propagation projections are available from Applied Spectrum Research, in Boulder, Colo., C.E.T., Inc., in Edgewater, Fla., SoftWright, in Denver, Colo., or H2A Communications, in Moscow, Id. The propagation analyses can account for weather effects, ground topography and composition, and directionally dependent interference or background noise, as desired.

Knowledge of the terrain conditions along the approximate direction of signal arrival can be used in estimating their effect on signal propagation. Furthermore, geographic features, such as hills or water boundaries, limit the domain of candidate positions at which the transceiver could likely be located in known ways. Thus, such topographic information can also be used as collateral information to enhance the efficiency and accuracy of any determination of location.

In rural areas, it is contemplated that correlating the line of bearing information with collateral information in the form of topological map-matching (i.e., matching of location information to the known geographic locations of roads or other features of the landscape) would be enough in most instances to monitor traffic flow along main roads as well as to facilitate the dispatch of emergency vehicles and roadside assistance. Rural areas have relatively few roads such that a line of bearing from the sensor station to the mobile radio transceiver would be sufficient to uniquely identify the probable position of the mobile radio transceiver.

In urban areas, it is thought to be less likely that the line of bearing and roadway map information will be enough, by and of itself, to uniquely locate the position of the mobile radio transceiver. In such instances additional information may be needed. The present invention contemplates applying collateral information in a knowledge-based position information processor 38. Processor 38 could integrate information from additional sources such as the geographic representation of the knowledge and judgment of an operator of an emergency assistance (9-1-1) center regarding the apparent position or probable region of the mobile radio transceiver.

The present invention also contemplates receiving supporting, descriptive information from the wireless communications system. The position-dependent information extracted from the received RF signal can be augmented with collateral information from the wireless communications system 34 in FIG. 3. RF antenna 33 can be, for example, the base station of a cellular telephone system that is nearest the remote transceiver, e.g. cellular telephone. The wireless communication system 34 tends to the demodulation of the communications from the remote transceiver. The descriptive information received through the wireless communication system can include positional knowledge such as voice expression of the fact that the transmission is from a vehicle on a roadway or the name of the road on which the mobile transceiver is traveling, which can be transformed into symbolic identification for use as collateral information in the correlated localization processing with measured lines of bearing. In the case of requests for assistance (such as in 9-1-1 calls), the answering operator routinely asks for the persons placing the calls to identify their calling numbers and their locations. Callers who do not know where they are can still describe their surroundings over the telephone. Thus, the present invention is designed to aid the assisting operator by exploiting information that the operator can rapidly elicit to quickly provide accurate locations. With the expression of a route number or street name from a caller, the correlated intersection of that road with an estimated direction of signal arrival quickly provides the probable location of the caller. When the route of travel is not known by the caller, the assisting operator can solicit information about the speed of travel and the proximity of prominent landmarks that are along the observed direction of signal arrival. All such position-related information, whether obtained manually or by automated analysis, can then be transformed into geographical form through graphical interaction or automated geographic interpretation for inclusion in the correlated evaluation with the extracted signal characteristics.

The entry of the geographical knowledge or understanding of the operator or human information source may be assisted through graphical interaction between the human and a work station terminal equipped with a graphical pointing device for automated point determination. While observing a computer-driven map display of the relevant area of roads, the operator could use the graphical input device to select an approximate position, a road identified by a caller's voice, or an ellipse or polygon of probable location based on communicated descriptions. Mathematical transformations for conversions of position representations between planar projection coordinates used in geographic displays and geodetic reference coordinates used with navigation and location reference systems are described in U.S. Geological Survey Professional Paper 1395, titled "Map Projections—A Working Manual", by John P. Snyder, incorporated herein by reference.

Alternatively, the operator could provide a textual entry of a communicated or inferred road name, a speed, a landmark, or a road intersection that may be communicated, perhaps in response to the operator's queries. This textual data could then be converted into approximate position information through correlation with a text-to-position transformation database such as that contained in addressing databases of the United Parcel Service maps or the 9-1-1 databases of the Public Service Answering Points. In advanced system implementations, the queries for correlated information could be solicited under automated control by voice synthesis or by computer interaction with a processor integrated into a vehicle's communication device, and the responses could be analyzed by voice recognition processing or direct data interface for entry into the correlation processing with the extracted bearing and associated characteristic measurements.

Figure 4:
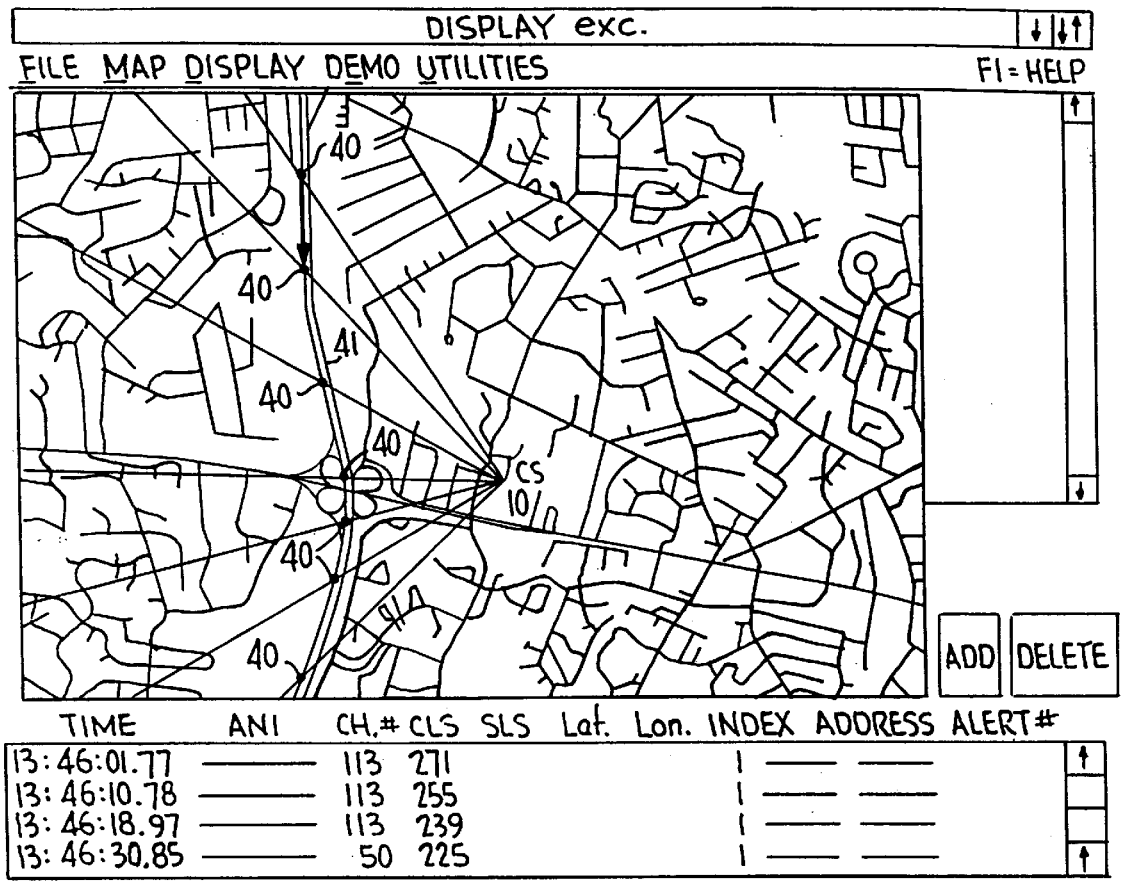
FIG. 4 shows a display of the intersections for directional data measurements with the road being traveled by an active cellular telephone, allowing the calculation of speed and direction of motion estimates.

FIG. 4 shows how to calculate the speed and direction of a mobile radio transceiver using information derived from successive measurements of lines of bearing with the example of a mobile radio transceiver 40 moving down a limited access highway 41 (Interstate highway 495, is shown). The operator or processor indicates points of intersection of the lines of bearing with a designated roadway (map-matching). The processor calculates the average speed between successive points. The rate of change of direction of arrival of a signal from the mobile radio transceiver 40 is proportional to the component of velocity of the transceiver that is perpendicular to the line of bearing from the receiver to the mobile transceiver. With the projection of this component onto the tangent to a candidate road at the point of intersection of the direction of arrival with the road, the corresponding speed and direction of motion can be estimated. Alternatively, the successive observation of directions of arrivals and the evaluation of the motion implications of their intersections with candidate road trajectories enable the more accurate estimation of motion parameters. Through correlation with a representation of appropriate road network speed distributions, further assessment of the probabilities that the estimated speeds could reasonably occur for each candidate route enables an even more likely estimate of the actual route being followed by the mobile transceiver.

The apparatus for the present invention can include general purpose processing facilities such as those of microprocessor workstations based on the Intel 80486 or Pentium central processing units (CPUs) or the Motorola 68040 or PowerPC CPUs. The correlation calculations will determine the optimal associations of measured bearings and other possible characteristics, communicated information, and/or human assessments with the supporting, collateral information stored on mass storage facilities such as the disks, CD ROMs, bubble memories, and tape drives common to such workstations and similar database servers. For rapid access to large quantities of geographical data of various types, the high-usage, mass-storage facilities should be interfaced to the data processing facilities via high-throughput, data communications paths, such as those employing direct processor-bus disk interfaces and ethernet interprocessor networks.

Figure 5:
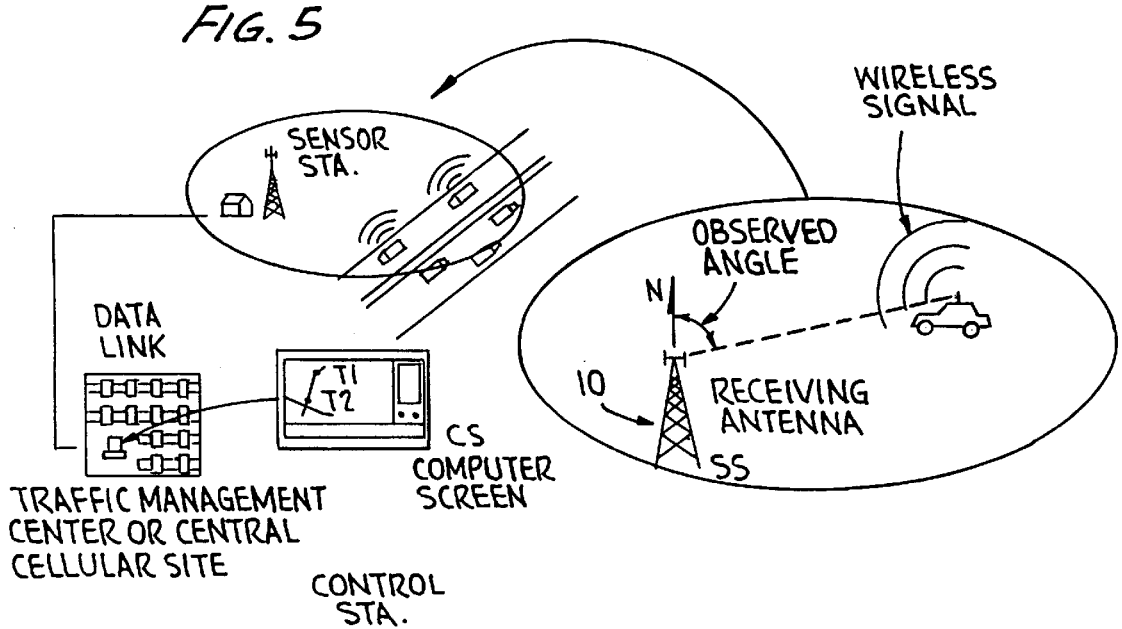
FIG. 5 shows a configuration for a system that applies the functions shown in FIG. 3.

FIG. 5 shows an implementation of the present invention applied as a way to monitor traffic flow using an existing cellular telephone network as the wireless communications system. The objective is to use a mobile transceiver 40 as a probe to determine the traffic flow along the highway 51. The representative cellular telephone 40 emits radio frequency signals that the receiver 32 at the sensor station 10 intercepts. Preferably, the information pertaining to the lines of bearing and other observed signal characteristics is then transmitted to a control station or traffic management center 53—preference should be given to transmitting the line-of-bearing and other characteristic information rather than the received signal or other such basic data to minimize the amount of information that is being transmitted. The line-of-bearing and correlated information is processed and can then be displayed on a computer monitor 54 together with other useful information derived therefrom such as the rate of travel of the vehicle on the highway 51.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing illustrative embodiments without departing from the scope and spirit of the present invention as set forth in the appended claims.

What is claimed is:

1. An apparatus for locating a mobile radio communications transceiver in an operating environment served by a wireless communications system, comprising:

at least a single sensor station having a directionally sensitive receiving antenna to receive a radio signal from the mobile transceiver, a signal characterization processing unit for determining, from the radio signal, at least one directional line of bearing from the single sensor station to the mobile radio transceiver, a source of collateral information about the operating environment of the mobile transceiver, a multidimensional parametric correlation processing unit for determining a probable position of the mobile transceiver directly from (1) the line of bearing information from the single sensor station and (2) the collateral information, and an output indicative of the probable position of the mobile transceiver.

2. An apparatus for locating a mobile radio communications transceiver in a wireless communications system as claimed in claim 1, wherein the multidimensional parametric correlation processing unit comprises a means for determining the relative motion of the radio transceiver from the line of bearing signal.

3. An apparatus for locating a mobile radio communications transceiver in a wireless communications system as claimed in claim 1, wherein the collateral information comprises databased information.

4. An apparatus for locating a mobile radio communications transceiver in a wireless communications system as claimed in claim 3, wherein the databased information comprises topological information.

5. An apparatus for locating a mobile radio communications transceiver in a wireless communications system as claimed in claim 4, wherein the topological information comprises map information.

6. An apparatus for locating a mobile radio communications transceiver in a wireless communications system as claimed in claim 4, wherein the topological information comprises roadway configuration information.

7. An apparatus for locating a mobile radio communications transceiver in a wireless communications system as claimed in claim 6, wherein the roadway configuration information comprises speed limit information.

8. An apparatus for locating a mobile radio communications transceiver in a wireless communications system as claimed in claim 4, wherein the topological information comprises information concerning landmarks.

9. An apparatus for locating a mobile radio communications transceiver in a wireless communications system as claimed in claim 3, wherein the databased information comprises signal propagation characteristics of the operating environment of the mobile transceiver.

10. An apparatus for locating a mobile radio communications transceiver in a wireless communications system as claimed in claim 3, wherein the databased information comprises traffic flow characteristics.

11. An apparatus for locating a mobile radio communications transceiver in a wireless communications system as claimed in claim 10, wherein the traffic flow characteristics comprise speed distribution information.

12. An apparatus for locating a mobile radio communications transceiver in a wireless communications system as claimed in claim 3, wherein the databased information comprises localized event information.

13. An apparatus for locating a mobile radio communications transceiver in a wireless communications system as claimed in claim 3, wherein the databased information comprises descriptions of users of the wireless communication system.

14. An apparatus for locating a mobile radio communications transceiver in a wireless communications system as claimed in claim 1, wherein the collateral information comprises communicated information.

15. An apparatus for locating a mobile radio communications transceiver in a wireless communications system as claimed in claim 14, wherein the communicated information comprises input from an operator.

16. An apparatus for locating a mobile radio communications transceiver in a wireless communications system as claimed in claim 14, wherein the communicated information comprises information on traffic conditions.

17. An apparatus for locating a mobile radio communications transceiver in a wireless communications system as claimed in claim 14, wherein the communicated information comprises road identification information.

18. An apparatus for locating a mobile radio communications transceiver in a wireless communications system as claimed in claim 1, wherein the collateral information comprises a measured physical characteristic of the radio signal in addition to the line of bearing information.

19. An apparatus for locating a mobile radio communications transceiver in a wireless communications system as claimed in claim 18, wherein the additional measured physical characteristic comprises signal strength.

20. An apparatus for locating a mobile radio communications transceiver in a wireless communications system as claimed in claim 18, wherein the additional measured physical characteristic comprises two way signal travel time.

21. An apparatus for locating a mobile radio communications transceiver in a wireless communications system as claimed in claim 8, wherein the additional measured physical characteristic comprises a time of arrival of the signal from the mobile radio transceiver.

22. An apparatus for locating a mobile radio communications transceiver in a wireless communications system as claimed in claim 1, wherein the collateral information comprises information supplied by the wireless communication system.

23. An apparatus for locating a mobile radio communications transceiver in a wireless communications system as claimed in claim 22, wherein the information supplied by the wireless communication system comprises signal strength information.

24. An apparatus for locating a mobile radio communications transceiver in a wireless communications system as claimed in claim 1, wherein the sensor station has a transportable configuration.

25. A method for locating a mobile radio communications transceiver operating in an environment served by a cellular communications system, comprising:
   measuring at least one line of bearing from at least a single sensor station to the mobile transceiver based on radio emissions from the mobile transceiver,
   inputting collateral information related to the operating environment of the mobile transceiver,
   correlating a probable position of the mobile transceiver directly from (1) the line of bearing information from the single sensor station and (2) the collateral information, and
   indicating a probable position of the mobile transceiver.

26. A method for locating a mobile radio communications transceiver in a cellular communications system as claimed in claim 25, wherein the collateral information comprises databased information.

27. A method for locating a mobile radio communications transceiver in a cellular communications system as claimed in claim 26, wherein the databased information comprises signal propagation characteristics of the operating environment of the mobile transceiver.

28. A method for locating a mobile radio communications transceiver in a cellular communications system as claimed in claim 26, wherein the databased information comprises traffic flow characteristics.

29. A method for locating a mobile radio communications transceiver in a cellular communications system as claimed in claim 26, wherein the traffic flow characteristics comprise speed distribution information.

30. A method for locating a mobile radio communications transceiver in a cellular communications system as claimed in claim 26, wherein the databased information comprises localized event information.

31. A method for locating a mobile radio communications transceiver in a cellular communications system as claimed in claim 26, wherein the databased information comprises descriptions of users of the wireless communication system.

32. A method for locating a mobile radio communications transceiver in a cellular communications system as claimed in claim 26, wherein the databased information comprises inputting topological information.

33. A method for locating a mobile radio communications transceiver in a cellular communications system as claimed in claim 32, wherein the topological information comprises map information.

34. A method for locating a mobile radio communications transceiver in a cellular communications system as claimed in claim 33, wherein the topological information comprises information concerning landmarks.

35. A method for locating a mobile radio communications transceiver in a cellular communications system as claimed in claim 32, wherein the topological information comprises roadway configuration information.

36. A method for locating a mobile radio communications transceiver in a cellular communications system as claimed in claim 35, wherein the topological information comprises speed limit information.

37. A method for locating a mobile radio communications transceiver in a cellular communications system as claimed in claim 25, wherein the collateral information comprises communicated information.

38. A method for locating a mobile radio communications transceiver in a cellular communications system as claimed in claim 37, wherein the communicated information comprises input from an operator.

39. A method for locating a mobile radio communications transceiver in a cellular communications system as claimed in claim 37, wherein the communicated information comprises information on traffic conditions.

40. A method for locating a mobile radio communications transceiver in a cellular communications system as claimed in claim 25, wherein the collateral information comprises a measured physical characteristic of the radio signal in addition to the line of bearing information.

41. A method for locating a mobile radio communications transceiver in a cellular communications system as claimed in claim 40, wherein the additional measured physical characteristic comprises signal strength information.

42. A method for locating a mobile radio communications transceiver in a cellular communications system as claimed in claim 40, wherein the additional measured physical characteristic comprises two way signal travel time.

43. A method for locating a mobile radio communications transceiver in a cellular communications system as claimed in claim 40, wherein the additional measured physical characteristic comprises measuring a time of arrival of the signal from the mobile radio transceiver.

44. A method for locating a mobile radio communications transceiver in a cellular communications system as claimed in claim 25, wherein the collateral information comprises information supplied by the wireless communication system.

45. A method for locating a mobile radio communications transceiver in a cellular communications system as claimed in claim 44, wherein the information supplied by the wireless communication system comprises signal strength information.

46. An method for locating a mobile radio communications transceiver in a cellular communications system as claimed in claim 25, further comprising measuring a plurality of lines of bearing from the sensor station and determining the relative motion of the plurality of lines of bearing.

47. An apparatus for locating a mobile radio transceiver operating in an environment served by a wireless communications system, comprising:
   at least a single sensor station,
   means for determining at least one line of bearing from the sensor station to the mobile radio communications transceiver, and
   means for directly combining (1) the collateral information about the operating environment of the mobile radio transceiver with (2) the line of bearing from the single sensor station to determine the location of the mobile radio transceiver.

48. An apparatus for locating a mobile radio transceiver in a wireless communications system as claimed in claim 47, wherein the collateral information comprises databased information.

49. An apparatus for locating a mobile radio transceiver in a wireless communications system as claimed in claim 48, wherein the databased information comprises signal propagation characteristics of the operating environment of the mobile transceiver.

50. An apparatus for locating a mobile radio transceiver in a wireless communications system as claimed in claim 49, wherein the databased information comprises descriptions of users of the wireless communications system.

51. An apparatus for locating a mobile radio transceiver in a wireless communications system as claimed in claim 49, wherein the collateral information comprises topological information.

52. An apparatus for locating a mobile radio transceiver in a wireless communications system as claimed in claim 51, wherein the topological information comprises map information.

53. An apparatus for locating a mobile radio transceiver in a wireless communications system as claimed in claim 51, wherein the topological information comprises roadway configuration information.

54. An apparatus for locating a mobile radio transceiver in a wireless communications system as claimed in claim 53, wherein the roadway configuration information comprises speed limit information.

55. An apparatus for locating a mobile radio transceiver in a wireless communications system as claimed in claim 51, wherein the topological information comprises landmark information.

56. An apparatus for locating a mobile radio transceiver in a wireless communications system as claimed in claim 48, wherein the databased information comprises traffic flow characteristics.

57. An apparatus for locating a mobile radio transceiver in a wireless communications system as claimed in claim 48, wherein the traffic flow characteristics comprise speed distribution information.

58. An apparatus for locating a mobile radio transceiver in a wireless communications system as claimed in claim 48, wherein the databased information comprises localized event information.

59. An apparatus for locating a mobile radio transceiver in a wireless communications system as claimed in claim 47, wherein the collateral information comprises communicated information.

60. An apparatus for locating a mobile radio transceiver in a wireless communications system as claimed in claim 59, wherein the communicated information comprises operator input information.

61. An apparatus for locating a mobile radio transceiver in a wireless communications system as claimed in claim 59, wherein the communicated information comprises information traffic condition information.

62. An apparatus for locating a mobile radio transceiver in a wireless communications system as claimed in claim 59, wherein the communicated information comprises road identification information.

63. An apparatus for locating a mobile radio transceiver in a wireless communications system as claimed in claim 47, wherein the collateral information comprises a measured physical characteristic of the radio signal in addition to the line of bearing information.

64. An apparatus for locating a mobile radio transceiver in a wireless communications system as claimed in claim 63, wherein the collateral information comprises signal strength information.

65. An apparatus for locating a mobile radio transceiver in a wireless communications system as claimed in claim 63, wherein the additional measured physical characteristic comprises two way signal travel time.

66. An apparatus for locating a mobile radio transceiver in a wireless communications system as claimed in claim 63, wherein the additional measured physical characteristic comprises a time of arrival of the signal from the mobile radio transceiver.

67. An apparatus for locating a mobile radio transceiver in a wireless communications system as claimed in claim 47, wherein the collateral information comprises information supplied by the wireless communication system.

68. An apparatus for locating a mobile radio transceiver in a wireless communications system as claimed in claim 67, wherein the information supplied by the wireless communication system comprises signal strength information.

69. An apparatus for locating a mobile radio transceiver in a wireless communications system as claimed in claim 47, wherein combining means comprises a means for determining multiple lines of bearing and means for determining any motion of the radio transceiver from the directional signal.

70. An apparatus for locating a mobile radio transceiver in a wireless communications system as claimed in claim 47, wherein the sensor station has a transportable configuration.

71. A method for locating a mobile radio transceiver operating in an environment served by a wireless communications system, comprising:
   determining at least one line of bearing to the mobile radio communications transceiver from a single sensor station, and
   directly combining (1) collateral information with (2) the line of bearing from the single sensor station to determine the location of the mobile radio transceiver.

72. A method for locating a mobile radio transceiver in a cellular communications system as claimed in claim 71, wherein the collateral information comprises databased information.

73. A method for locating a mobile radio transceiver in a cellular communications system as claimed in claim 72, wherein the databased information comprises signal propagation characteristics of the operating environment of the mobile transceiver.

74. A method for locating a mobile radio transceiver in a cellular communications system as claimed in claim 72, wherein the databased information comprises traffic flow characteristics.

75. A method for locating a mobile radio transceiver in a cellular communications system as claimed in claim 74, wherein the traffic flow characteristics comprise speed distribution information.

76. A method for locating a mobile radio transceiver in a cellular communications system as claimed in claim 72, wherein the databased information comprises localized event information.

77. A method for locating a mobile radio transceiver in a cellular communications system as claimed in claim 72, wherein the databased information comprises descriptions of users of the wireless communication system.

78. A method for locating a mobile radio transceiver in a cellular communications system as claimed in claim 72, wherein the databased information comprises topological information.

79. A method for locating a mobile radio transceiver in a cellular communications system as claimed in claim 78, wherein the topological information comprises map information.

80. A method for locating a mobile radio transceiver in a cellular communications system as claimed in claim 78, wherein the topological information comprises roadway configuration information.

81. A method for locating a mobile radio transceiver in a cellular communications system as claimed in claim 80, wherein the roadway configuration information comprises speed limit information.

82. A method for locating a mobile radio transceiver in a cellular communications system as claimed in claim 78, wherein the topological information comprises information concerning landmarks.

83. A method for locating a mobile radio transceiver in a wireless communications system as claimed in claim 71, wherein the collateral information comprises communicated information.

84. A method for locating a mobile radio transceiver in a wireless communications system as claimed in claim 83, wherein the collateral information comprises operator input information.

85. A method for locating a mobile radio transceiver in a wireless communications system as claimed in claim 83, wherein the communicated information comprises traffic condition information.

86. A method for locating a mobile radio transceiver in a cellular communications system as claimed in claim 71, wherein the collateral information comprises a measured physical characteristic of the radio signal in addition to the line of bearing information.

87. A method for locating a mobile radio transceiver in a wireless communications system as claimed in claim 86, wherein the additional measured physical characteristic of the radio signal comprises signal strength information.

88. A method for locating a mobile radio transceiver in a cellular communications system as claimed in claim 86, wherein the additional measured physical characteristic comprises two way signal travel time.

89. A method for locating a mobile radio transceiver in a cellular communications system as claimed in claim 86, wherein the additional measured physical characteristic comprises measuring a time of arrival of the signal from the mobile radio transceiver.

90. A method for locating a mobile radio transceiver in a cellular communications system as claimed in claim 71, wherein the collateral information comprises information supplied by the wireless communication system.

91. A method for locating a mobile radio transceiver in a cellular communications system as claimed in claim 90, wherein the information supplied by the wireless communication system comprises signal strength information.

92. An method for locating a mobile radio transceiver in a cellular communications system as claimed in claim 71, further comprising measuring a plurality of lines of bearing from the sensor station and determining the relative motion of the plurality of lines of bearing.

* * * * *